United States Patent [19]
Mitchell et al.

[11] Patent Number: 5,826,186
[45] Date of Patent: Oct. 20, 1998

[54] METHOD FOR TERMINATING A WIRELESS COMMUNICATION OF A MOBILE COMMUNICATION UNIT

[75] Inventors: John Mitchell, Crystal Lake; Matthew A. Houghton, Lake Zurich, both of Ill.

[73] Assignee: Motorola, Inc., Schaumburg, Ill.

[21] Appl. No.: 736,870

[22] Filed: Oct. 25, 1996

[51] Int. Cl.⁶ .................................................. H04Q 7/38

[52] U.S. Cl. .................. 455/410; 455/411; 455/424; 380/23

[58] Field of Search ..................................... 455/408, 410, 455/411, 422, 423, 424, 425, 433, 67.1, 507, 517, 524; 340/825.31, 825.34; 380/23

[56] References Cited

U.S. PATENT DOCUMENTS

| | | | |
|---|---|---|---|
| 5,335,278 | 8/1994 | Matchett et al. ......................... | 455/411 |
| 5,448,760 | 9/1995 | Frederick ................................. | 455/411 |
| 5,467,382 | 11/1995 | Schorman ................................ | 455/410 |
| 5,541,977 | 7/1996 | Hodges et al. ........................... | 455/411 |

OTHER PUBLICATIONS

Motorola Service Node brochure.
Motorola Document entitled "Fraud Release Feature CSP408D (Modified Dec. 18, 1995), Analog System Requirements and Architecture".
Motorola Document entitled "Fraud Prevention System Call Teardown CSP471D Feature Requirements Quote".

*Primary Examiner*—Thanh Cong Le
*Attorney, Agent, or Firm*—Heather L. Creps

[57] ABSTRACT

The method operates in a system including a switching center, a base station responsive to the switching center and a mobile communication unit responsive to the base station, and includes receiving a first message from the mobile communication unit; in response to the first message, determining whether the mobile communication unit is fraudulent; based on the determination, receiving a second message at the switching center from a dedicated fraud indicator wireline connection; and in response to the second message, terminating the wireless communication of the mobile communication unit.

4 Claims, 4 Drawing Sheets

METHOD FOR TERMINATING A WIRELESS COMMUNICATION OF A MOBILE COMMUNICATION UNIT

FIELD OF THE INVENTION

This invention relates generally to wireless communication systems, and, more particularly, to a method for terminating a wireless communication of a mobile communication unit and to a system for identifying a fraudulent mobile communication unit.

BACKGROUND OF THE INVENTION

In a typical wireless communication system such as an analog cellular radio frequency (RF) radiotelephone system, a base station having a controller and a plurality of transmitters and receivers communicates with a switching center and with a mobile communication unit, or station, operating within an area served by the base station.

Identification codes such as an electronic serial number (ESN) and/or a mobile identification number (MIN) distinguish the mobile station from other mobile stations, and may be used by the base station or switching center to authorize the mobile station to engage in wireless communications. Identification codes are frequently intercepted, however, and may be used by a fraudulent mobile station to place and receive wireless communications. Often, the communications of the fraudulent mobile station are billed to the legitimate mobile station.

Although the fraudulent mobile station and the legitimate mobile station have the same ESN and MIN, it has been discovered that the physical characteristics of their transmitters, which produce some distortion in RF signals, are unique. Thus, a radio frequency signal will altered by the fraudulent mobile's transmitter in a manner which may be slightly different from the manner in which the same radio frequency signal will be altered by the legitimate mobile station's transmitter. These unique distortions may be detected and used to create security patterns, called RF fingerprints, which are typically stored in a database and used by a fraud prevention program to detect fraudulent mobile stations. A detailed description of RF fingerprinting technology may be found in U.S. Pat. No. 5,448,760 to Frederick, incorporated herein by reference.

According to one known method for terminating a fraudulent mobile station's wireless communication, when a fraudulent mobile station is detected, for example, by comparing its RF fingerprint to the RF fingerprint of a legitimate mobile station having the same ESN and MIN, a call release message is transmitted on the same radio frequency as the fraudulent wireless communication. Thus, a base station falsely detects that the fraudulent mobile station has ended the communication. The legitimate mobile station, however, may still be billed for the fraudulent call.

According to a second method for terminating a fraudulent wireless communication, a second wireless communication is originated by a fraud prevention system using the same ESN and MIN as the fraudulent mobile station. Then, because two wireless communications have the same ESN and MIN, one of the communications is automatically torn down. But, if the second communication does not include a unique code indicating that it was placed by the fraud prevention system, the legitimate mobile station's communication may be prematurely aborted.

The foregoing methods also suffer from additional problems. For example, valuable RF resources may be usurped by a fraud prevention system when terminating fraudulent communications. And, like the ESNs and MINs of legitimate mobile stations, the RF communications used to terminate the fraudulent communications are also susceptible to interception and duplication.

Moreover, implementations of known fraud prevention methods may vary based on a signaling or messaging protocol associated with a particular RF technology. Thus, if a fraud prevention system is operated in a variety of different systems, costly RF equipment may be required for each system, and detecting the fraudulent mobile which is roaming outside of its home system may be difficult.

There is therefore a need for a method and a system for terminating a fraudulent wireless communication of a mobile communication unit which does not leave a billing residue, which does not require radio frequency transmission hardware, which is secure, and which may be ubiquitously utilized by various communication systems.

SUMMARY OF THE INVENTION

According to an aspect of the present invention, the foregoing needs are addressed by a method for terminating a wireless communication of a mobile communication unit which operates in a system including a switching center, a base station responsive to the switching center and the mobile communication unit responsive to the base station. The method includes receiving a first message from the mobile communication unit; in response to the first message, determining whether the mobile communication unit is fraudulent; based on the determination, receiving a second message at the switching center from a dedicated fraud indicator wireline connection; and in response to the second message, terminating the wireless communication of the mobile communication unit.

According to another aspect of the present invention, a method for terminating a wireless communication of the mobile communication unit operates in a communication system including a first switching center, a second switching center responsive to the first switching center, a second base station responsive to the second switching center and the mobile communication unit responsive to the second base station. The method includes providing a system for identifying a fraudulent mobile communication unit, the system comprising a signal capture device in communication with the second base station, an intelligent peripheral responsive to the signal capture device, a service node responsive to the intelligent peripheral, and a dedicated wireline connection coupling the service node and the first switching center; receiving at the base station a first message from the mobile communication unit; determining a radio frequency signal characteristic of the mobile communication unit by the signal capture device; receiving the radio frequency signal characteristic by the intelligent peripheral; determining whether the mobile communication unit is fraudulent; based on the determination, receiving a second message at the first switching center from the dedicated wireline connection, the second message identifying the mobile communication unit as fraudulent; in response to the second message, receiving a third message at the second switching center from the first switching center; and in response to the third message, terminating the communication of the mobile unit by the base station.

According to still another aspect of the present invention, a method for terminating a wireless communication of a mobile communication unit operates in a communication system comprising a gateway switching center, a roamer switching center in communication with the gateway switching center, a roamer base station responsive to the roamer switching center and the mobile communication unit responsive to the roamer base station. The method includes providing a system for identifying a fraudulent mobile communication unit, the system comprising a signal capture device in communication with the roamer base station, a signal identifier device responsive to the signal capture device, a service node having a controller and a switch, the controller responsive to the signal identifier device and in communication with the switch, and a dedicated wireline connection coupling the switch and the gateway switching center; receiving at the roamer base station a first message from the mobile communication unit;

determining a radio frequency signal characteristic of the mobile communication unit by the signal capture device; receiving the radio frequency signal characteristic by the signal identifier device; determining whether the mobile communication unit is fraudulent; based on the determination, receiving a second message at the gateway switching center from the dedicated wireline connection identifying the mobile communication unit as fraudulent;

in response to the second message, receiving a third message at the roamer switching center from the gateway switching center; and in response to the third message, terminating the communication of the mobile unit by the roamer base station.

According to a further aspect of the present invention, a method for terminating a wireless communication of a mobile communication unit operates in a communication system including a home location register, a switching center in communication with the home location register, a base station in communication with the switching center and a mobile communication unit responsive to the base station. The method includes receiving a first message from the mobile communication unit; in response to the first message, determining whether the mobile communication unit is fraudulent; based on the determination, receiving a second message at the home location register from a dedicated fraud indicator data link; and in response to the second message, terminating the wireless communication of the mobile communication unit.

In an even further aspect of the present invention, a system for identifying a fraudulent mobile communication unit operates in a wireless communication system comprising a switching center, a base station responsive to the switching center and a mobile communication unit responsive to the base station. The system includes a fraud detection system in communication with the base station. A service node is responsive to the fraud detection system. A dedicated wireline connection couples the service node and the switching center, and the switching center receives a message from the dedicated wireline connection identifying the mobile communication unit as fraudulent.

In a still further aspect of the present invention, a system for identifying a fraudulent mobile communication unit operates in a wireless communication system including a home location register, a switching center in communication with the home location register, a base station in communication with the switching center and a mobile communication unit responsive to the base station. The system includes a fraud detection system in communication with the base station. A service node is responsive to the fraud detection system. A dedicated data link couples the service node and the home location register, and the home location register receives a message from the dedicated data link identifying the mobile communication unit as fraudulent.

Advantages of the present invention will become readily apparent to those skilled in the art from the following description of the preferred embodiment(s) of the invention which have been shown and described by way of illustration. As will be realized, the invention is capable of other and different embodiments, and its details are capable of modifications in various respects. Accordingly, the drawings and description are to be regarded as illustrative in nature, and not as restrictive.

DETAILED DESCRIPTION OF THE PREFERRED EMBODIMENTS

Figure 1:
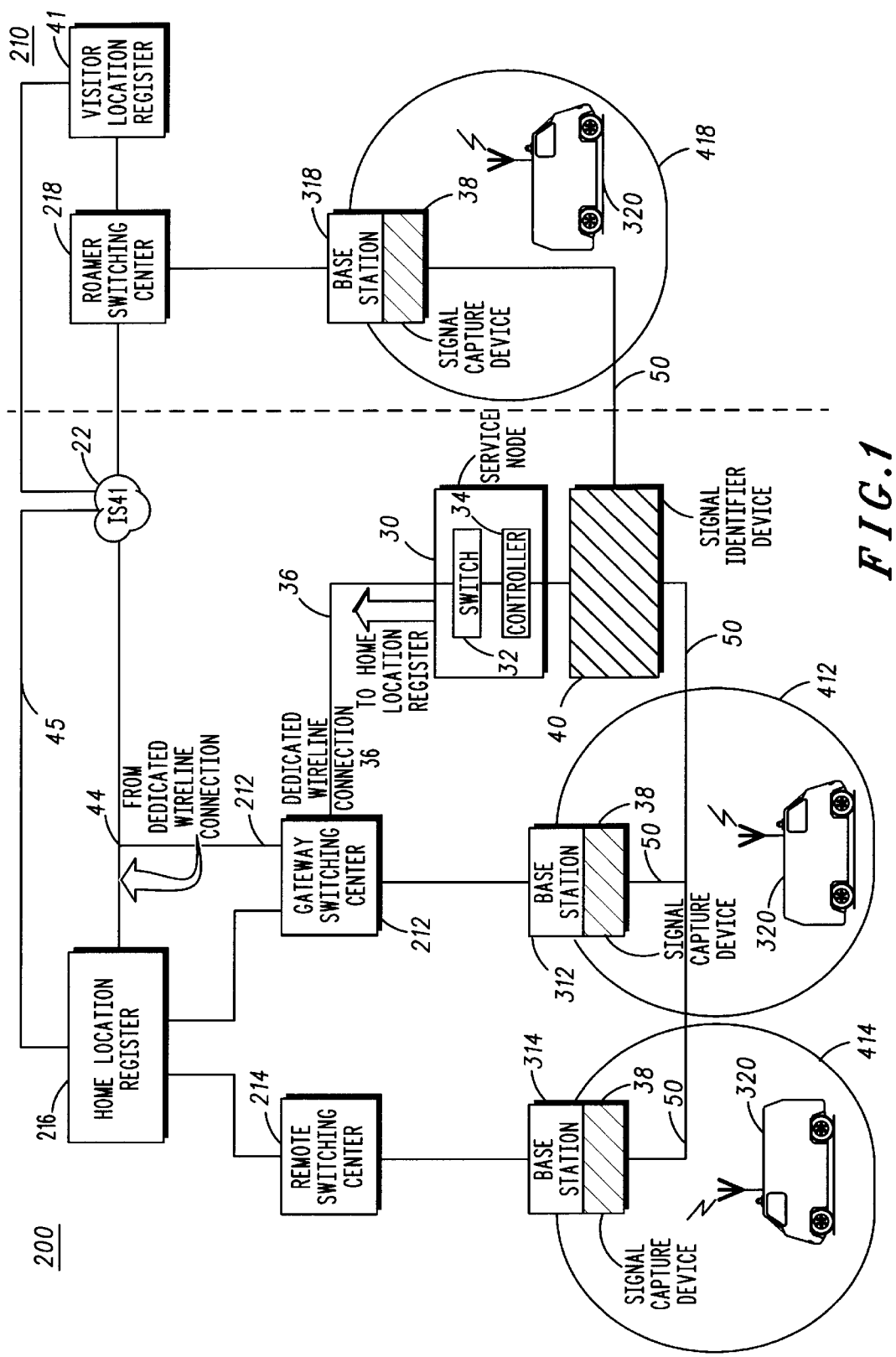
FIG. 1 is a block diagram of a wireless communication system according to a preferred embodiment of the present invention.

Turning now to the drawings, wherein like numerals designate like components, FIG. 1 is a block diagram of a wireless communication system for terminating a wireless communication of a fraudulent mobile communication unit according to a preferred embodiment of the present invention. Two wireless radiotelephone communication systems 200, 210 are shown. In system 200, a gateway switching center 212, which may be a mobile switching center such as an EMX™ 2500, commercially available from Motorola, Inc. in Arlington Heights, Ill., or another suitable type of switching center, is in communication with a base station 312. Base station 312 may further include one or more controllers (not shown), at least one processor (not shown), one or more memories (not shown) and a plurality of transceivers (not shown). Additional base stations (not shown) may also be coupled to gateway switching center 212.

A remote switching center 214, which may be an EMX™ 2500 or another kind of switch, is coupled to gateway switching center 212. Switching center 214 is in communication with a base station 314, preferably configured in the same manner as base station 312. Additional base stations (not shown) may also be coupled to remote switching center 214.

Home location register (HLR) 216 is in communication with both gateway switching center 212 and remote switching center 214. Suitable home location registers are commercially available from Motorola, Inc.

System 200 communicates with system 210 via a data link 44 between gateway switching center 212 and a roamer switching center 218 (discussed further below), or alternatively via a data link 45 between HLR 216 and a visitor location register (VLR) 217 (also discussed further below).

Of course, a single data link may be used in place of links 44 and 45. Communication between system 200 and system 210 may occur by way of a protocol such as Interim Standard 41, published by the Telecommunications Industry Association, Washington, D.C., or via another suitable protocol, such protocols being commonly known.

System 210 includes a roamer switching center 218, such as an EMX™ 2500 or another type of switching center, and also includes a base station 318 in communication with roamer switching center 218. Base station 318 preferably includes at least one controller (not shown), one or more processors (not shown), at least one memory (not shown) and a plurality of transceivers (not shown). A visitor location register 46 is in communication with link 44, link 45 and with roamer switching center 218.

A mobile station 320, which may operate in areas 412, 414 or 418 served by base stations 312, 314 and 318, respectively, is designed to communicate with base stations 312, 314 and 318. Multiple access wireless communication between base stations 212, 214 and 218 and mobile station 320 preferably occurs over radio frequency (RF) channels which provide physical paths over which analog or digital communication signals such as voice, data and video are transmitted. Base-to-mobile station communications are said to occur on a forward-link channel, while mobile-to-base station communications are referred to as being on a reverse-link channel. A communication system using analog channelization which is suitable for use with the various embodiments of the present invention is described in detail in Interim Standard 91, implemented by the Advanced Mobile Phone Service (AMPS) and incorporated by reference herein.

Base stations 312, 314 and 318 are in communication with signal capture devices 38. Signal capture devices 38 are configured to detect a signal characteristic of a wireless communication signal sent over the reverse-link channel. For example, signal capture devices 38 may detect a distortion of the wireless communication signal which is attributable to unique physical characteristics of mobile station 320's transmitter, referred to herein as an RF fingerprint of mobile station 320.

Mobile station 320 preferably has at least one RF fingerprint, which may be forwarded, over lines 50, from signal capture devices 38 to an intelligent peripheral 40. Additional control software (not shown) may be in communication with signal identifier device 40. Intelligent peripheral 40 may be a signal identifier device, which compares the forwarded RF fingerprint to a pre-existing RF fingerprint of a legitimate mobile, to detect fraudulent mobile stations masquerading as mobile stations with legitimate ESNs and MINs.

Communication between signal capture devices 38 and signal identifier device 40 may occur by way of an ethernet connection using a well-known signaling protocol such as Transmission Control Protocol/Internet Protocol (TCP/IP).

A fraud detection system including items such as signal capture devices 38, signal identifier device 40 and additional software which is suitable for use with the present invention is commercially available from Corsair Communications, located in Palo Alto, Calif. Another suitable fraud detection system is offered by Cellular Technical Services, Co. Inc., located in Seattle, Wash.

A service node 30, such as a Motorola Service Node, available from Motorola, Inc. in Arlington Heights, Ill., is in communication with gateway switching center 212. Service node 30 preferably includes a programmable switch 32, such switches being well-known and widely available, and a controller 34, such as a general-purpose computer.

Service node 30 and and gateway switching center 212 are coupled by a dedicated wireline connection 36, which may in fact be a dedicated trunk group. Suitable signaling protocols for communication over dedicated wireline connection 36 include, but are not limited to, multi-frequency (MF) signaling, C7 signaling, system signaling 7 (SS7) and European and analog digital trunk signaling systems such as embodied in the R2 series of specifications. Alternatively, a data link, which may utilize IS-41 signaling protocol, may couple service node 30 and home location register 216.

Service node 30 is also is responsive to signal identifier device 40. A detailed specification suitable for use between intelligent peripherals such as signal identifier device 40 (and signal capture devices 38) and service node 30, for communicating via an ethernet connection utilizing a TCP/IP signaling protocol follows the specification, and precedes the claims, as Appendix A.

Figure 2:
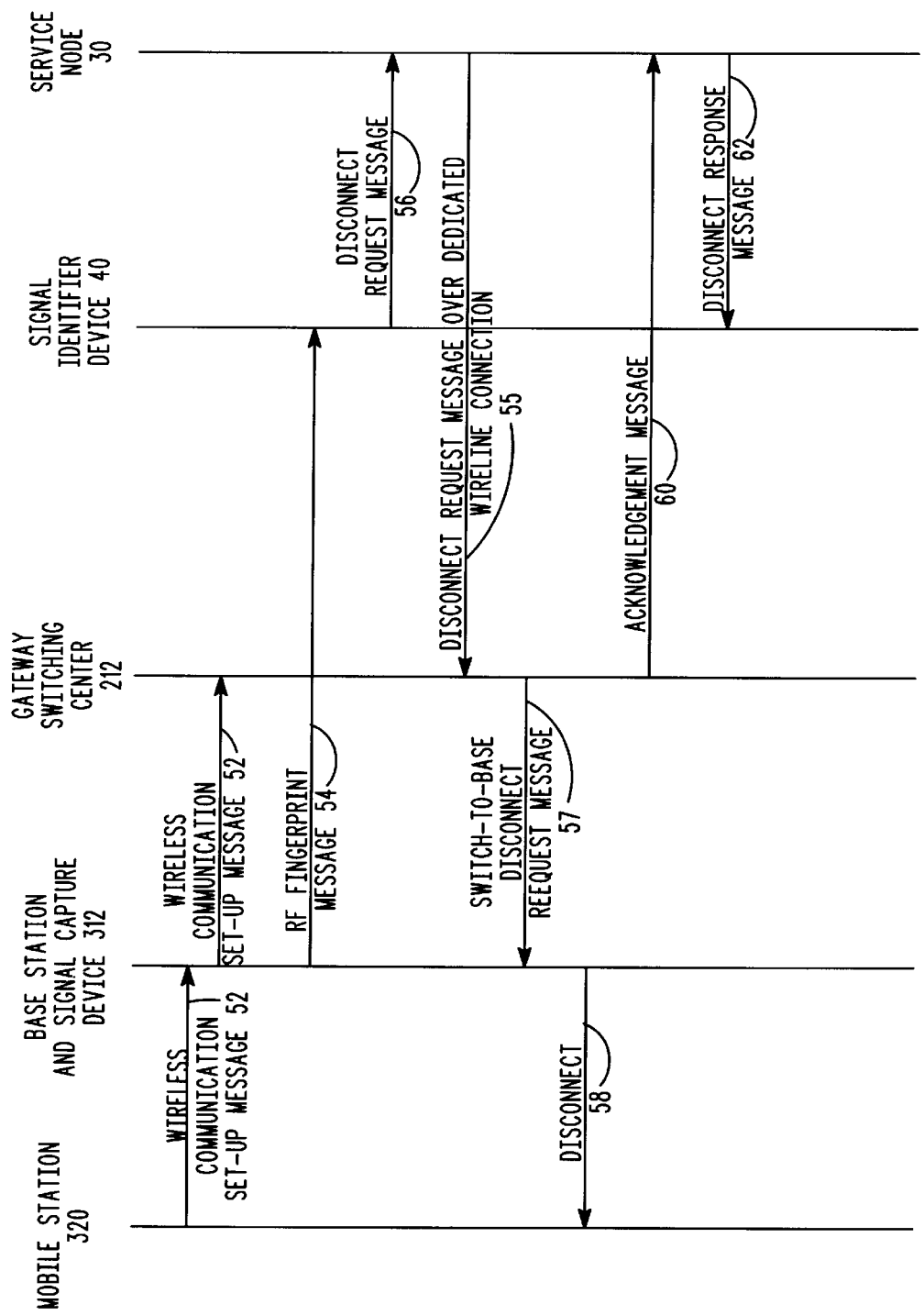
FIG. 2 is a call flow diagram illustrating a method for terminating a wireless communication of a fraudulent mobile communication unit operating within the system depicted in FIG. 1, according to one embodiment of the present invention.

FIG. 2 is a call flow diagram illustrating a method for terminating a wireless communication of a fraudulent mobile station 320 (depicted in FIG. 1) operating within area 412 served by base station 312. For purposes of discussion, it is assumed that a legitimate mobile station (not shown) having the same ESN and MIN as mobile station 320 is registered at gateway switching center 212.

A wireless communication set-up message 52 is transmitted by mobile station 320 to base station 312. Message 52 may be, for example, a request from mobile station 320 to originate a wireless communication, or may be an acknowledgment that mobile station 320 is available to receive a wireless communication originated elsewhere.

Based on message 52, signal capture device 38 associated with base station 312 identifies a radio frequency signal characteristic of mobile station 320, such as an RF fingerprint, and forwards the RF fingerprint to signal identifier device 40 via an RF fingerprint message 54. RF fingerprint message 54 may also include identifying information for mobile station 320, such as its ESN and MIN, along with a number of base station 312 with which mobile station 320 is in communication and a system number in which mobile station 320 is operating.

Signal identifier device 40 receives RF fingerprint message 54 and compares the RF fingerprint therein with an RF fingerprint of the legitimate mobile station having the same ESN and MIN. If signal identifier device 40 determines that mobile station 320's RF fingerprint does not match the RF fingerprint of the legitimate mobile station, then signal identifier device 40 transmits a disconnect request message 56 to service node 30. Disconnect request message 56, among other things, identifies mobile station 320 as fraudulent and requests disconnection of the wireless communication. Message 56 preferably includes the MIN, a reference value which may be used to uniquely identify the disconnection request, the base station number and the system identification number.

Upon receipt of disconnect request message 56, service node 30 transmits a similar disconnect request message 55 to gateway switching center 212 via dedicated wireline connection 36. Alternatively, service node 30 may transmit disconnect request message 55 directly to HLR 216.

Gateway switching center 212 instructs base station 312 to tear down the wireless communication of fraudulent mobile station 320 via switch-to-base disconnect request message 57.

Once the wireless communication of fraudulent mobile station 320 has been disconnected by base station 312, by an action depicted by arrow 58, gateway switching center 212 transmits an acknowledgment message 60 to service node 30.

Service node 30 confirms that the wireless communication of mobile station 320 has been disconnected by transmitting a disconnect response message 62 to signal identifier device 40.

Figure 3:
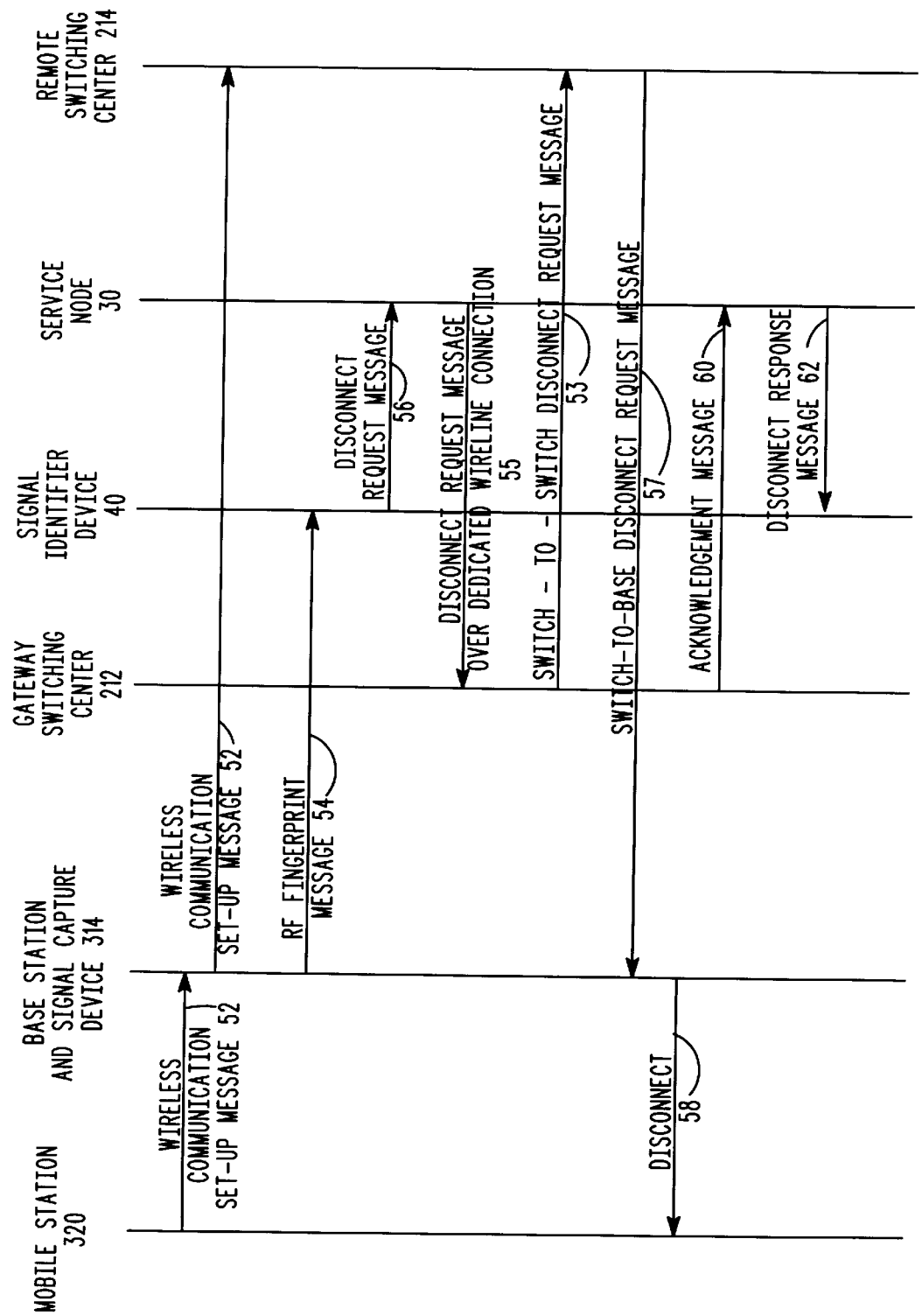
FIG. 3 is a call flow diagram illustrating a method for terminating a wireless communication of a fraudulent mobile communication unit operating within the system depicted in FIG. 1, according to another embodiment of the present invention.

FIG. 3 is a call flow diagram illustrating a method for terminating a wireless communication of a fraudulent mobile station 320 (depicted in FIG. 1) operating within area 414 served by base station 314. For purposes of discussion, it is assumed that a legitimate mobile station (not shown) having the same ESN and MIN as mobile station 320 is registered at gateway switching center 212.

A wireless communication set-up message 52 is transmitted by mobile station 320 to base station 314. Message 52 may be, for example, a request from mobile station 320 to originate a wireless communication, or may be an acknowledgment that mobile station 320 is available to receive a wireless communication originated elsewhere.

Based on message 52, signal capture device 38 associated with base station 314 identifies a radio frequency signal characteristic of mobile station 320, such as an RF fingerprint, and forwards the RF fingerprint to signal identifier device 40 via an RF fingerprint message 54.

Signal identifier device 40 receives RF fingerprint message 54 and compares the RF fingerprint therein with an RF fingerprint of the legitimate mobile station having the same ESN and MIN. If signal identifier device 40 determines that mobile station 320 is fraudulent, then signal identifier device 40 transmits a disconnect request message 56 to service node 30.

Upon receipt of disconnect request message 56, service node 30 transmits a similar disconnect request message 55 to gateway switching center 212 via dedicated wireline connection 36. Alternatively, service node 30 may transmit disconnect request message 55 directly to HLR 216.

Gateway switching center 212 instructs remote switching center 214 to tear down the wireless communication of fraudulent mobile station 320 via switch-to-switch disconnect request message 53.

In turn, remote switching center 214 instructs base station 314 to tear down the wireless communication of fraudulent mobile station 320 via switch-to-base disconnect request message 57.

Once the wireless communication of fraudulent mobile station 320 has been disconnected by base station 314, by an action depicted by arrow 58, gateway switching center 212 transmits an acknowledgment message 60 to service node 30.

Service node 30 confirms that the wireless communication of mobile station 320 has been disconnected by transmitting a disconnect response message 62 to signal identifier device 40.

Figure 4:
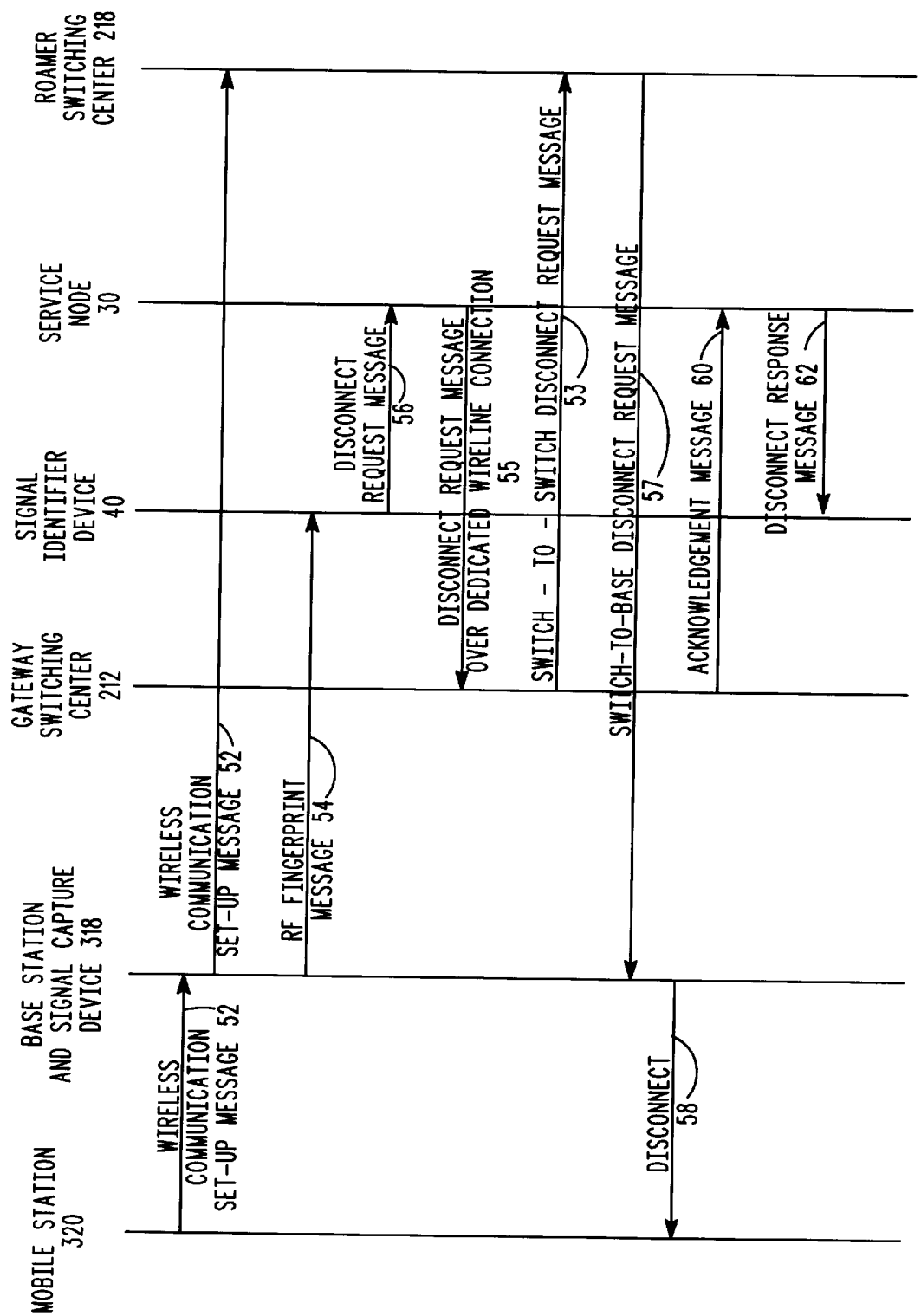
FIG. 4 is a call flow diagram illustrating a method for terminating a wireless communication of a fraudulent mobile communication unit operating within the system depicted in FIG. 1, according to a further embodiment of the present invention.

FIG. 4 is a call flow diagram illustrating a method for terminating a wireless communication of a fraudulent mobile station 320 (depicted in FIG. 1) roaming within area 418 served by base station 318. For purposes of discussion, it is assumed that a legitimate mobile station (not shown) having the same ESN and MIN as mobile station 320 is registered at gateway switching center 212.

A wireless communication set-up message 52 is transmitted by mobile station 320 to base station 318. Message 52 may be, for example, a request from mobile station 320 to originate a wireless communication, or may be an acknowledgment that mobile station 320 is available to receive a wireless communication originated elsewhere.

Based on message 52, signal capture device 38 associated with base station 318 identifies a radio frequency signal characteristic of mobile station 320, such as an RF fingerprint, and forwards the RF fingerprint to signal identifier device 40 via an RF fingerprint message 54.

Signal identifier device 40 receives RF fingerprint message 54 and compares the RF fingerprint therein with an RF fingerprint of the legitimate mobile station having the same ESN and MIN. If signal identifier device 40 determines that mobile station 320 is fraudulent, then signal identifier device 40 transmits a disconnect request message 56 to service node 30.

Upon receipt of disconnect request message 56, service node 30 transmits a similar disconnect request message 55 to gateway switching center 212 via dedicated wireline connection 36. Alternatively, service node 30 may transmit disconnect request message 55 directly to HLR 216.

Gateway switching center 212 instructs roamer switching center 218 to tear down the wireless communication of fraudulent mobile station 320 via switch-to-switch disconnect request message 53. It is contemplated that message 53 may utilize the IS-41 signaling protocol. If message 55 was transmitted directly to HLR 216, however, HLR 216 may instruct roamer switching center 218 or VLR 217 to tear down the wireless communication via a separate message (not shown).

In turn, roamer switching center 218 instructs base station 318 to tear down the wireless communication of fraudulent mobile station 320 via switch-to-base disconnect request message 57.

Once the wireless communication of fraudulent mobile station 320 has been disconnected by base station 314, by an action depicted by arrow 58, gateway switching center 212 transmits an acknowledgment message 60 to service node 30.

Service node 30 confirms that the wireless communication of mobile station 320 has been disconnected by transmitting a disconnect response message 62 to signal identifier device 40.

Requesting disconnection of a wireless communication using dedicated wireline connection 36, or via a data link to HLR 216, has many advantages. For example, the call disconnection method is secure, and does not waste valuable RF resources.

In addition, the legitimate mobile station is not billed for fraudulent communications, and an intelligent peripheral obtains a positive acknowledgment that the fraudulent communication has been disconnected.

Further, the system and methods described herein may be used independent of RF technology. Thus, no additional hardware is required at individual base stations and dedicated wireline connections allow the ubiquitous disconnection of calls in separate systems, even when air interfaces associated with particular RF technologies in separate systems are different.

The foregoing discussions of FIGS. 2–4 assume that a legitimate mobile station (not shown) having the same ESN and MIN as mobile station 320 is registered at gateway switching center 212. If the legitimate mobile station is registered at another switching center (not shown), referred to as a home switching center, then, before gateway switching center 212 forwards a disconnect request message 56 to a switching center serving mobile station 320, the home switching center would be queried in a well-known manner by gateway switching center to 212 to determine an identity of the switching center serving the mobile station.

General analog cellular communication systems have been referred to herein, but the present invention is applicable to any communication system, including but not limited to other analog communication systems such as Total Access Communication System (TACS), and digital communication systems such as Groupe Special Mobile (GSM), a European time division multiple access (TDMA) system, Pacific Digital Cellular (PDC), a Japanese TDMA system, Interim Standard 54 (IS-54), a U.S. TDMA system and Interim Standard 96 (IS-96), a code division multiple access system.

The principles of the present invention which apply to cellular-based communication systems may also apply to other types of communication systems, including but not limited to personal communication systems, trunked systems, satellite communication systems and data networks. Likewise, the principles of the present invention which apply to all types of radio frequency channels also apply to other types of communication channels, such as electronic data buses, wireline channels, optical fiber links and satellite links.

It will be apparent that other and further forms of the invention may be devised without departing from the spirit and scope of the appended claims and their equivalents. For example, although an RF-fingerprinting fraud detection system has been described herein, it should be understood that any type of fraud detection system, along with other kinds of systems, may be employed with present invention. It will also be understood that this invention is not to be limited in any manner to the specific embodiments described above, but will only be governed by the following claims and their equivalents.

We claim:

1. In a communication system comprising a first switching center, a second switching center responsive to the first switching center, a second base station responsive to the second switching center and a mobile communication unit responsive to the second base station, a method for terminating a wireless communication of the mobile communication unit, comprising the steps of:

providing a system for identifying a fraudulent mobile communication unit, the system comprising
a signal capture device in communication with the second base station,
an intelligent peripheral responsive to the signal capture device,
a service node responsive to the intelligent peripheral, and
a dedicated wireline connection coupling the service node and the first switching center;

receiving at the base station a first message from the mobile communication unit;

determining a radio frequency signal characteristic of the mobile communication unit by the signal capture device;

receiving the radio frequency signal characteristic by the intelligent peripheral;

determining whether the mobile communication unit is fraudulent;

based on the determination, receiving a second message at the first switching center from the dedicated wireline connection, the second message identifying the mobile communication unit as fraudulent;

in response to the second message, receiving a third message at the second switching center from the first switching center; and in response to the third message, terminating the communication of the mobile unit by the base station.

2. The method according to claim 1, wherein the third message utilizes an International Standard 41 (IS-41) protocol.

3. In a communication system comprising a gateway switching center, a roamer switching center in communication with the gateway switching center, a roamer base station responsive to the roamer switching center and a mobile communication unit responsive to the roamer base station; a method for terminating a wireless communication of the mobile communication unit, comprising the steps of:

providing a system for identifying a fraudulent mobile communication unit, the system comprising
a signal capture device in communication with the roamer base station,
a signal identifier device responsive to the signal capture device,
a service node having a controller and a switch, the controller responsive to the signal identifier device and in communication with the switch, and
a dedicated wireline connection coupling the switch and the gateway switching center;

receiving at the roamer base station a first message from the mobile communication unit;

determining a radio frequency signal characteristic of the mobile communication unit by the signal capture device;

receiving the radio frequency signal characteristic by the signal identifier device;

determining whether the mobile communication unit is fraudulent;

based on the determination, receiving a second message at the gateway switching center from the dedicated wireline connection identifying the mobile communication unit as fraudulent;

in response to the second message, receiving a third message at the roamer switching center from the gateway switching center; and in response to the third message, terminating the communication of the mobile unit by the roamer base station.

4. The method according to claim 3, wherein the third message utilizes an IS-41 protocol.

* * * * *